May 31, 1960

N. W. PION 2,938,430

SCREW RETAINED SPIN ROCKET

Filed May 17, 1954

INVENTOR.
NOEL W. PION
BY *William R. Lane*
ATTORNEY.

May 31, 1960
N. W. PION
2,938,430
SCREW RETAINED SPIN ROCKET
Filed May 17, 1954
3 Sheets-Sheet 2
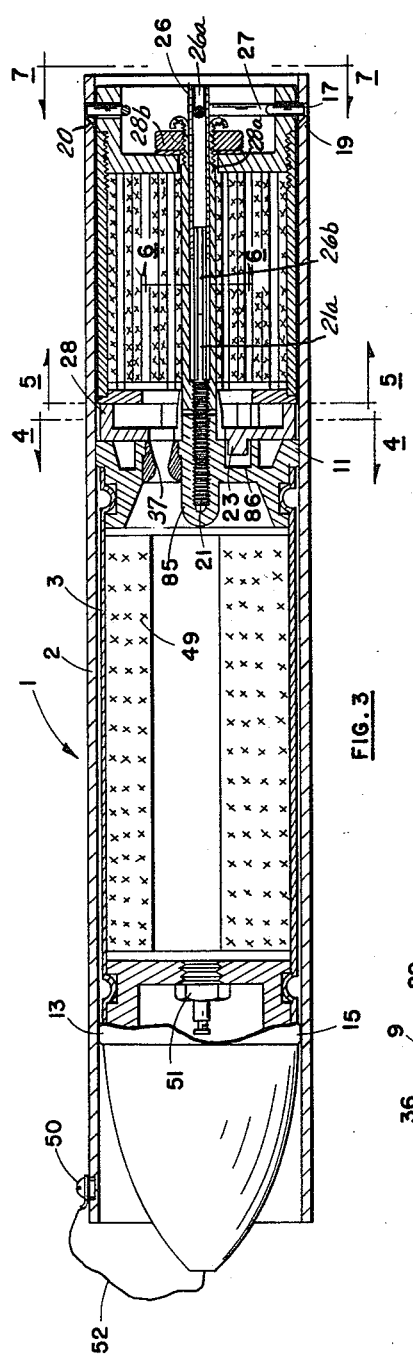
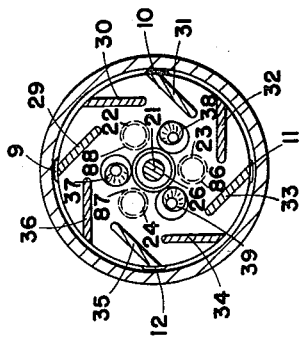
INVENTOR.
NOEL W. PION
BY William L. Lane
ATTORNEY May 31, 1960  N. W. PION  2,938,430
SCREW RETAINED SPIN ROCKET
Filed May 17, 1954  3 Sheets-Sheet 3
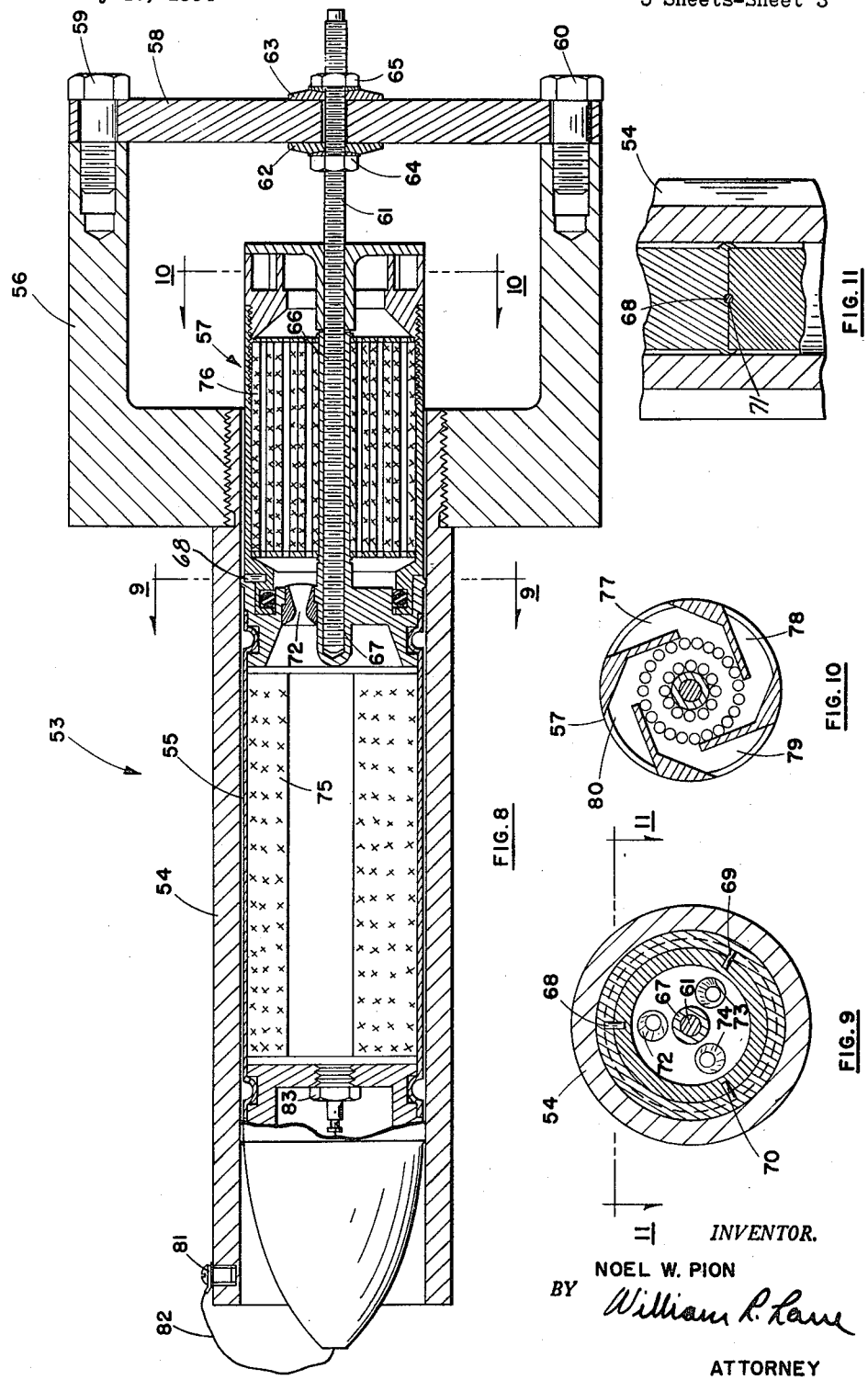
INVENTOR.
NOEL W. PION
BY William R. Lane
ATTORNEY

United States Patent Office 2,938,430
Patented May 31, 1960

2,938,430
SCREW RETAINED SPIN ROCKET

Noel W. Pion, Covina, Calif., assignor to North American Aviation, Inc.

Filed May 17, 1954, Ser. No. 430,075

5 Claims. (Cl. 89—1.7)

This invention pertains to a spinning type rocket and more particularly to a spinning type rocket which is held by a screw to prevent its release until the rocket is spinning rapidly about its major axis.

Spin rockets are rockets which are adapted to rapidly rotate about their major axis to stabilize their flight when they are fired in a direction other than the direction of flight of their supporting vehicle. Prior known spin rockets are angularly accelerated by means of a releasable cartridge which is carried therewith or by means of canted nozzles. One disadvantage of the releasable cartridge type, wherein the cartridge is carried with the rocket, is that both the mass of the rocket and its moment of inertia about its major axis is increased, thereby requiring more energy to provide thrust and spin. When only canted nozzles are utilized to cause a rocket to spin about its major axis, the nozzles must be canted to a high degree to provide sufficient angular acceleration whereby their thrust in the direction of flight of the rocket is decreased. If the amount of cant on the nozzles is not very great, sufficient thrust is provided but the rocket does not achieve a high angular velocity prior to its release from the end of its launching tube.

The device contemplated by this invention is the combination of a spin rocket and means for applying a torque about the major axis of the spin rocket, while simultaneously retaining the rocket within the launching tube until it reaches a predetermined angular velocity. The spin rocket of this invention is attached to a torque generating means by a screw or worm. The screw is wound into the after end of the rocket and is oriented in the direction of the major axis thereof. The torque generating means applies torque to angularly accelerate the rocket and to wind it off of the screw, whereby the rocket is released and freed to launch itself out of the launching tube.

Prior known spin rockets have been clumsy and require an appreciable amount of space. The preferred embodiment of the device of this invention is adapted to be tandem-launched; that is, a plurality of rockets of this invention can be stored in and consecutively launched from a single launching tube.

It is therefore an object of this invention to provide means for tandem-launching a plurality of spin rockets.

It is another object of this invention to provide launching means for mounting a spin rocket in rotational relation relative to a means for rotating said rocket about its major axis.

It is still another object of this invention to provide means for angularly accelerating a spin rocket about its major axis prior to launching.

It is yet another object of this invention to provide means for simultaneously angularly accelerating a spin rocket about its major axis and retaining said rocket in abutment with a torque generating means.

It is another object of this invention to provide a screw type retaining means for preventing a spin rocket from being launched prior to its achieving a predetermined angular velocity.

Other objects of invention will become apparent from the following description taken in connection with the accompanying drawings, in which Fig. 1 is a profile view of an aircraft showing a launching tube oriented upon the after end thereof for launching the rockets of this invention;

Fig. 3 is a view partly in section of the preferred embodiment of this invention;

Fig. 4 is a view taken at 4—4 in Fig. 3;

Fig. 5 is a view taken at 5—5 in Fig. 3;

Fig. 6 is an enlarged view taken at 6—6 in Fig. 3;

Fig. 7 is a view taken at 7—7 in Fig. 3;

Fig. 8 is a view partly in section of a second embodiment of this invention;

Fig. 9 is a view taken at 9—9 in Fig. 8;

Fig. 10 is a view taken at 10—10 in Fig. 8;

And Fig. 11 is a view taken at 11—11 in Fig. 9.

Figure 1:
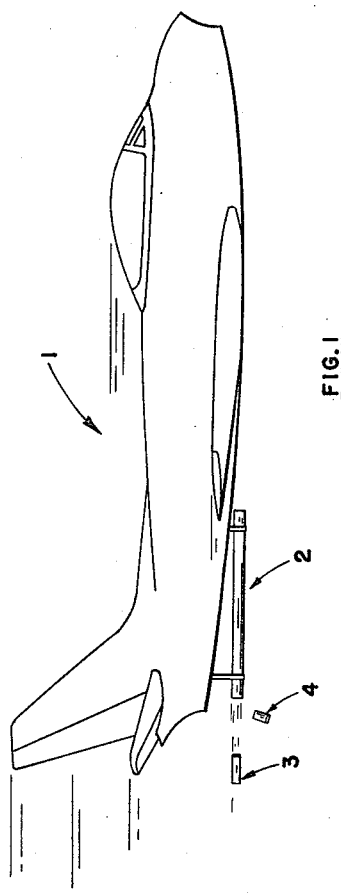

In Fig. 1 supporting aircraft 1 carries launching tube 2 upon its after end oriented in a direction other than the direction of its velocity. One of spin rockets 3 is shown being launched from tube 2 and one of powder cartridges 4 is shown being ejected therefrom.

Figure 2:
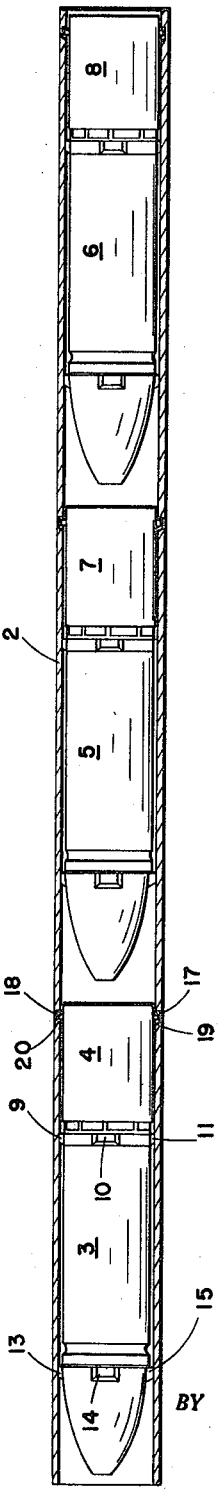
Fig. 2 is a view partly in section of the launching tube of this invention together with a preferred embodiment of the spin rocket.

In Fig. 2 three of a plurality of spin rockets of the preferred type are shown. Rockets 3, 5, and 6 are shown in line or in tandem inside of launching tube 2. Powder cartridges 4, 7, and 8 are associated with spin rockets 3, 5, and 6, respectively. Rockets 3, 5, and 6 are identical and powder cartridges 4, 7, and 8 are identical. Only one rocket 3 and powder cartridge 4 will be described herein. Rocket 3 is slidingly supported within launching tube 2 by means of lands 9, 10, 11, and 12 positioned upon its after end and shown more particularly in Fig. 4 and an identical set of lands 13, 14, 15, and 16 upon its forward end, of which only lands 13, 14, and 15 are shown in Fig. 2. Rocket 3 is attached to powder cartridge 4 by means of threaded members shown more particularly in Fig. 3 to be described hereinafter. Studs 17 and 18 upon the after end of powder cartridge 4 are, in reality, the end of an S-shaped spring 27 shown and described more particularly in connection with Figs. 3 and 7. Studs 17 and 18 fit into slots 19 and 20, respectively, in the inner surface of launching tube 2. Slots 19 and 20 are shaped, as shown in Figs. 2 and 3, to prevent backward movement to the right in Fig. 2, but are shaped on a bevel to allow forward movement of cartridge 4. Slots 19 and 20 are also adapted to prevent rotation of powder cartridge 4 prior to its release as described hereinafter.

In Fig. 3 rocket 3 is attached to screw 21 by means of threaded cylinder 85 positioned coaxially with the major axis of rocket 3 upon the after end thereof. A clutch comprising a plurality of extending studs and receptive female portions connects turbine 28 and rocket 3. The clutch members are shown dotted in Fig. 4. Studs 22, 23 and 24 engage receptive female portions or slots 86, 87 and 88. Only elements 23 and 86 are shown in Fig. 3. Turbine 28 has a plurality of blades or vanes shown more particularly in Fig. 4. Turbine 28 is rigidly attached to and rotatable with a rearwardly extending hollow shaft 28a which is internally threaded at its forward end. Shaft 28a is terminated at its after end with a nut 28b fixed to restrain forward motion and rotate with the shaft. Sleeve 26, positioned interiorly of shaft 28a rearwardly of the threaded portion, is held stationary by means of S-shaped spring 27 extending through a slot 26a in the after end of the sleeve. Sleeve 26 contains a passage 25b of hexagonal cross-section axially through a portion of its length.

Integral with screw 21 is a rearward portion or shank 21a of hexagonal cross-section matching and slidable within passage 26b of sleeve 26. Screw 21 is thus prevented from turning with turbine 28 and rocket 3 to which it is threadedly attached. During operation when turbine 28 begins to rotate, driving rocket 3 by means of the clutch described above, screw 21 slides rearwardly through passage 26b. This rearward movement is possible since while turbine 28 is rotating over the threads of screw 21 the advance of turbine 28 is prevented by nut 28b acting through shaft 28a. Screw 21, being prevented from turning, must then slide rearward. Turbine 28 and rocket 3, being screwed into abutment and clutch connected, rotate together until screw 21 has progressed rearwardly a sufficient distance to release its threads from engagement with those of rocket 3. Rocket 3 is then free and it is promptly propelled forwardly and launched from the mouth of launching tube 2.

In Fig. 4, a plurality of vanes or turbine blades 29 through 36 are shown as an integral part of turbine 28. Nozzles 37, 38 and 39 upon the after end of rocket 3 are shown canted slightly in the direction of rocket spin.

In Fig. 5, a plurality of ports, shown generally by 40, are adapted to direct ignited gases against the blades of turbine 28.

In Fig. 6, a particular powder charge configuration comprising cylindrical tubes 41 through 48 is shown more particularly. These tubes of powder are particularly adapted for use in the rocket of this invention. In Fig. 6 turbine 28 is shown to clear the hexagonal shank of screw 21.

In Fig. 7, S-shaped spring 27 passes through member 26 to prevent its turning relative to cartridge 4 and fits into slots 19 and 20 to prevent cartridge 4 from turning or from moving in an after direction.

As shown more particularly in Fig. 3 powder charge 49 is the main powder charge of rocket 3. Powder charge 49 is adapted to be ignited by an igniter (not shown). Electrical energy is carried between terminal 50 upon the outside of launching tube 2 and terminal 51 within rocket 3 by means of conductor 52.

An alternative embodiment of the device of this invention is shown in Figs. 8, 9, 10 and 11. This embodiment is adapted to launch spin rockets singly. In Fig. 8 launching tube 53 is divided into two sections. The forward section 54 is adapted to hold and direct rocket 55 in a firing position. After portion 56 of launching tube 53 is attached to portion 54 to direct exhaust gases emitted by rocket 55 and spin cartridge 57 to prevent damage caused by the heat thereof. After portion 56 of launching tube 3 is also adapted to support, by means of bracket 58 and screws 59 and 60, a stationary threaded member 61 positioned to extend into forward portion 54 concentric with launching tube 53. Threaded member 61 may be either a screw or a worm. Threaded member 61 passes through bracket 58 and is attached thereto by means of plates 62 and 63 and by means of nuts 64 and 65.

Spin cartridge 57 is adapted by means of cylindrical threaded portion 66 to screw onto member 61. Threaded portion 66 extends the entire length of spin cartridge 57 and is coaxial with the major axis thereof. Rocket 55 also has a threaded portion 67 positioned upon its after end and coaxial with the major axis thereof. Threaded portion 67 screws onto threaded member 61 until it abuts against spin cartridge 57. Torque pins 68, 69 and 70 shown more particularly in Fig. 9 are adapted to fit into slots of which one slot 71 is shown more particularly in Fig. 11 to provide means connected to transmit torque between spin cartridge or torque means 57 and rocket 55. Pins 68, 69 and 70 are slidable in slots 71 which are radially directed from the major axis of rocket 55. Rocket ports or discharge nozzles 72, 73 and 74 upon the after end of rocket 55 are substantially directed in the direction of flight of rocket 55, although they may be slightly canted to maintain angular velocity of spin about the major axis of rocket 55. A pyrotechnic device or propellent mixture, such as powder charge 75, within rocket 3 is adapted when ignited to generate the gases which pass through rocket propelling nozzles 72, 73 and 74 into a pyrotechnic device or propellent mixture such as powder mixture 76 within spin cartridge 57. Powder charge 76, when ignited, generates gases which pass through spin nozzle means or tangentially directed orifices 77, 78, 79 and 80 as shown more particularly in Fig. 10 to generate a torque about the major axis of spin cartridge 57 and rocket 55.

Electrical terminal 81 is connected by means of conductor 82 to terminal 83 to provide means for igniting propellent mixture 75 of rocket 55.

In operation of the device shown and described in Figs. 2, 3, 4, 5, 6 and 7, when rocket 3 is launched, powder cartridge 4 remains stationary and rocket 3 passes out of the mouth of launching tube 2. When rocket 3 is ignited, gases are generated which are expelled from turbine 28 between lands 9, 10, 11 and 12 into the space between launching tube 2 and rocket 3, thence between lands 13, 14, 15 and 16. Similarly, gases are expelled by rocket 5 against the end of powder cartridge 4, pushing cartridge 4 forward and releasing it from launching tube 2 along the bevel of slots 19 and 20, thence forcing powder cartridge 4 out of the mouth of launching tube 2 prior to the release of rocket 5 from powder cartridge 7.

As shown more particularly in Fig. 3, an electrical voltage is supplied to terminal 50, thence by way of contact 52 to terminal 51 whereby powder charge 49 is ignited causing expanding hot gases to pass through nozzles 37, 38 and 39 into and ignite powder charges 41, 42, 43, 44, 45, 46, 47 and 48 within powder cartridge 4. When the powder charge within powder cartridge 4 is ignited the gases are expelled from powder cartridge 4 against turbine blades 29, 30, 31, 32, 33, 34, 35, and 36 of turbine 28 thereby turning turbine 28 and expelling the gases into the space between launching tube 2 and rocket 3. When turbine 28 turns it also turns rocket 3 by engagement of the clutch between turbine 28 and rocket 3. This clutch is shown more particularly in the dotted lines in Fig. 4 by studs 22, 23, and 24 and by clutch slots 86, 87 and 88 in the after end of rocket 3. When rocket 3 and turbine 28 turn, screw or worm 21 does not turn but because turbine 28 is prevented from advancing, screw 21 is caused to slide into member 26 thereby releasing rocket 3 after rocket 3 has turned a predetermined number of revolutions. When rocket 5 is fired, cartridge 4 is forced forward or directed from right to left in Fig. 3 whereby S-shaped spring 27 disengages slots 19 and 20 because of the bevel thereof in a forward direction.

In the alternative embodiment shown in Figs. 8, 9, 10 and 11, spin cartridge 57 and rocket 55 are initially in engagement. Pins 68, 69 and 70 transmit torque from spin cartridge 57 to rocket 55. When a voltage is applied to terminal 81, conductor 82 causes the voltage to be applied to terminal 83 whereby powder charge 75 is ignited generating gases which pass through nozzles 72, 73 and 74 into the powder charge 76 of spin cartridge 57. The expanding gases from spin cartridge 57 pass in an aft direction into spin nozzles 77, 78, 79 and 80 and thence to the atmosphere. Spin cartridge 57 is caused to angularly accelerate about its major axis by virtue of the escape of gases through spin nozzles 77, 78, 79 and 80. The torque generated by spin cartridge 57 is transmitted to rocket 55. Hence spin cartridge 57 and rocket 55 rotate together unwinding themselves off of screw 61 until rocket 55 is completely unwound off of screw 61, at which time the forward thrust of the escaping gases from nozzles 72, 73 and 74 disengages rocket 55 from spin cartridge 57 and propels rocket 55 out of the mouth of launching tube 54.

Thus means have been provided for producing a high angular velocity of spin about the major axis of a rocket prior to its launching and for tandem-launching spin rockets, thereby conserving space and weight.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination a launching tube; a plurality of spin rockets and a plurality of powder cartridge devices positioned in tandem within said launching tube; each said powder cartridge being connected to said tube in juxtaposition to the after end of one of said spin rockets and forwardly releasable from said tube; each said powder cartridge having a rotatable turbine associated therewith and being directed to drive said turbine, each said turbine being clutch-connected to one of said rockets; each said turbine and its respective rocket being connected by screw means to be held in engagement, said screw means being slidable away from said rocket as said rocket unwinds therefrom; each said rocket having ports and lands thereon to allow escaping gases to pass between said rocket and said tube to impinge upon the after end of said powder cartridge immediately forward thereof to eject said powder cartridge from the mouth of said launching tube.

2. In combination a launching tube, a spin rocket axially contained within said launching tube and having a forward and an after end, torque generating means, said means comprising a rotatable turbine, a clutch connecting said turbine in abutment with said after end of said rocket and a powder containing cartridge releasably secured to said tube and located axially and rearwardly adjacent said turbine, means rotatably securing said turbine to said cartridge, screw means connecting and retaining said rocket and said turbine in abutment during a pre-launch spin phase, and forwardly releasably spring means connecting said torque generating means to said launching tube.

3. In combination a launching tube, a plurality of spin rocket and torque generator assemblies tendemly arranged within said tube, each of said rockets having a forward and an after end, each of said torque generators comprising a pyrotechnic-containing cartridge and a turbine means, said cartridge being retained in a semi-fixed relationship within said tube and rearwardly spaced from one of said rockets, said cartridge being forwardly releasable and removable from said tube responsive to gas pressures generated within said tube by the cartridge mounted tandemly rearward of said prior mentioned cartridge, said turbine means being juxtaposed between said rocket and said cartridge in each assembly and clutch connected to said after end of said rocket, a hollow shaft having an internally threaded forward end and being fixed to and rearwardly extending from said turbine, said shaft being axially secured and rotatable within said cartridge, a keyway-containing sleeve having a slotted after end and being retained within said hollow shaft by spring means connected between said sleeve after end, said cartridge and said launching tube, screw means axially integral with key means, said key means situated and rearwardly slidable within said keyway, said screw means threadedly connecting said turbine means to said after end of said rocket.

4. In combination a torque generating means and a spin rocket; said torque generating means comprising a turbine, a clutch connecting said turbine to said rocket, a cartridge coaxially adjacent to said turbine oppositely of said rocket, and pyrotechnic means contained in said cartridge, directed to cause said turbine to spin; slidable screw means having a non-rotatable shank and being slidable rearwardly in the direction of the major axis of said rocket, said pyrotechnic means disposed about said shank, said screw means engaging said turbine and said rocket and retaining said turbine in abutment with the after end of said rocket throughout a pre-launch spin phase, whereby said turbine causes said rocket to spin and unwind off of said screw means thereby causing said screw means to slide in a direction away from said rocket to release said rocket after it has turned a pre-determined number of revolutions.

5. Spin rocket launching means comprising a launching tube for directing a rocket; screw means having a non-rotatable shank and being slidable rearwardly in the direction of the major axis of said rocket; means integral with the after end of said rocket for screwing said rocket on to said screw; a torque generating means rotatable upon said screw; said torque generating means being retained by said screw rearwardly of and in axial abutment with said rocket throughout a pre-launch spin phase, a cartridge including a powder charge surrounding said screw means, and a plurality of tangentially directed vanes; said torque generating means further including means connected to said rocket to transmit torque therebetween whereby when said torque generating means is energized, a spin torque is applied to said rocket to cause said rocket to angularly accelerate and wind itself off of said screw and to launch itself from said launching tube.

References Cited in the file of this patent

UNITED STATES PATENTS

| 533,572 | Unge | Feb. 5, 1895 |
| 1,102,653 | Goddard | July 7, 1914 |
| 1,307,607 | Wilkins | June 24, 1919 |
| 1,611,431 | Froelich | Dec. 21, 1926 |
| 2,313,030 | Tauschek | Mar. 2, 1943 |

FOREIGN PATENTS

| 25,326 | Great Britain | of 1894 |
| 404,815 | Italy | July 6, 1943 |
| 912,398 | France | Apr. 29, 1946 |
| 457,201 | Italy | May 12, 1950 |
| 672,346 | Great Britain | May 21, 1952 |